United States Patent
Naruse

(10) Patent No.: US 9,288,343 B2
(45) Date of Patent: Mar. 15, 2016

(54) PROCESSING APPARATUS, CHARGING METHOD, AND STORAGE MEDIUM STORING PROGRAM

(71) Applicant: CANON KABUSHIKI KAISHA, Tokyo (JP)

(72) Inventor: Taketomo Naruse, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/332,174

(22) Filed: Jul. 15, 2014

(65) Prior Publication Data

US 2015/0036177 A1 Feb. 5, 2015

(30) Foreign Application Priority Data

Jul. 31, 2013 (JP) .................................. 2013-159720

(51) Int. Cl.
*H04N 1/04* (2006.01)
*H04N 1/00* (2006.01)

(52) U.S. Cl.
CPC ...... *H04N 1/00307* (2013.01); *H04N 2201/006* (2013.01); *H04N 2201/0094* (2013.01)

(58) Field of Classification Search
CPC .................. H04N 1/00307; H04N 2201/0094; H04N 2201/006

USPC .................................. 358/1.15, 1.13, 1.9, 474
See application file for complete search history.

(56) References Cited

U.S. PATENT DOCUMENTS

| 2006/0077431 A1* | 4/2006 | Zhang ................ H04N 1/00204 358/1.15 |
| 2010/0241543 A1* | 9/2010 | Matsumoto ............ G03G 21/02 705/34 |
| 2013/0229672 A1 | 9/2013 | Naruse |

FOREIGN PATENT DOCUMENTS

| JP | 2006-48270 A | 2/2006 |
| JP | 2007-140990 A | 6/2007 |

OTHER PUBLICATIONS

U.S. Appl. No. 14/321,112, filed Jul. 1, 2014. Applicant: Taketomo Naruse.
U.S. Appl. No. 14/337,795, filed Jul. 22, 2014. Applicant: Taketomo Naruse, et al.

* cited by examiner

*Primary Examiner* — Houshang Safaipour
(74) *Attorney, Agent, or Firm* — Fitzpatrick, Cella, Harper & Scinto

(57) ABSTRACT

When the time required for one charging process is longer than the processing time of the execution unit of a job, one charging process is performed for a plurality of execution units of a job.

11 Claims, 13 Drawing Sheets

FIG. 10A

| PRINTING OF FIRST PAGE | PRINTING OF SECOND PAGE | PRINTING OF THIRD PAGE | PRINTING OF FOURTH PAGE | PRINTING OF FIFTH PAGE | PRINTING OF SIXTH PAGE | ... |
|---|---|---|---|---|---|---|
| | CHARGING FOR FIRST PAGE | | CHARGING FOR SECOND, THIRD PAGES | | CHARGING FOR FOURTH, FIFTH PAGES | |

FIG. 10B

PRINTING OF FIRST PAGE / PRINTING OF SECOND PAGE / PRINTING OF THIRD PAGE / PRINTING OF FOURTH PAGE / PRINTING OF FIFTH PAGE / PRINTING OF SIXTH PAGE / PRINTING OF SEVENTH PAGE / PRINTING OF EIGHTH PAGE / PRINTING OF NINTH PAGE / PRINTING OF TENTH PAGE / PRINTING OF ELEVENTH PAGE / PRINTING OF TWELFTH PAGE / PRINTING OF THIRTEENTH PAGE

CHARGING FOR FIRST PAGE

CHARGING FOR SECOND, THIRD, FOURTH, AND FIFTH PAGES

CHARGING FOR SIXTH, SEVENTH, EIGHTH, AND NINTH PAGES

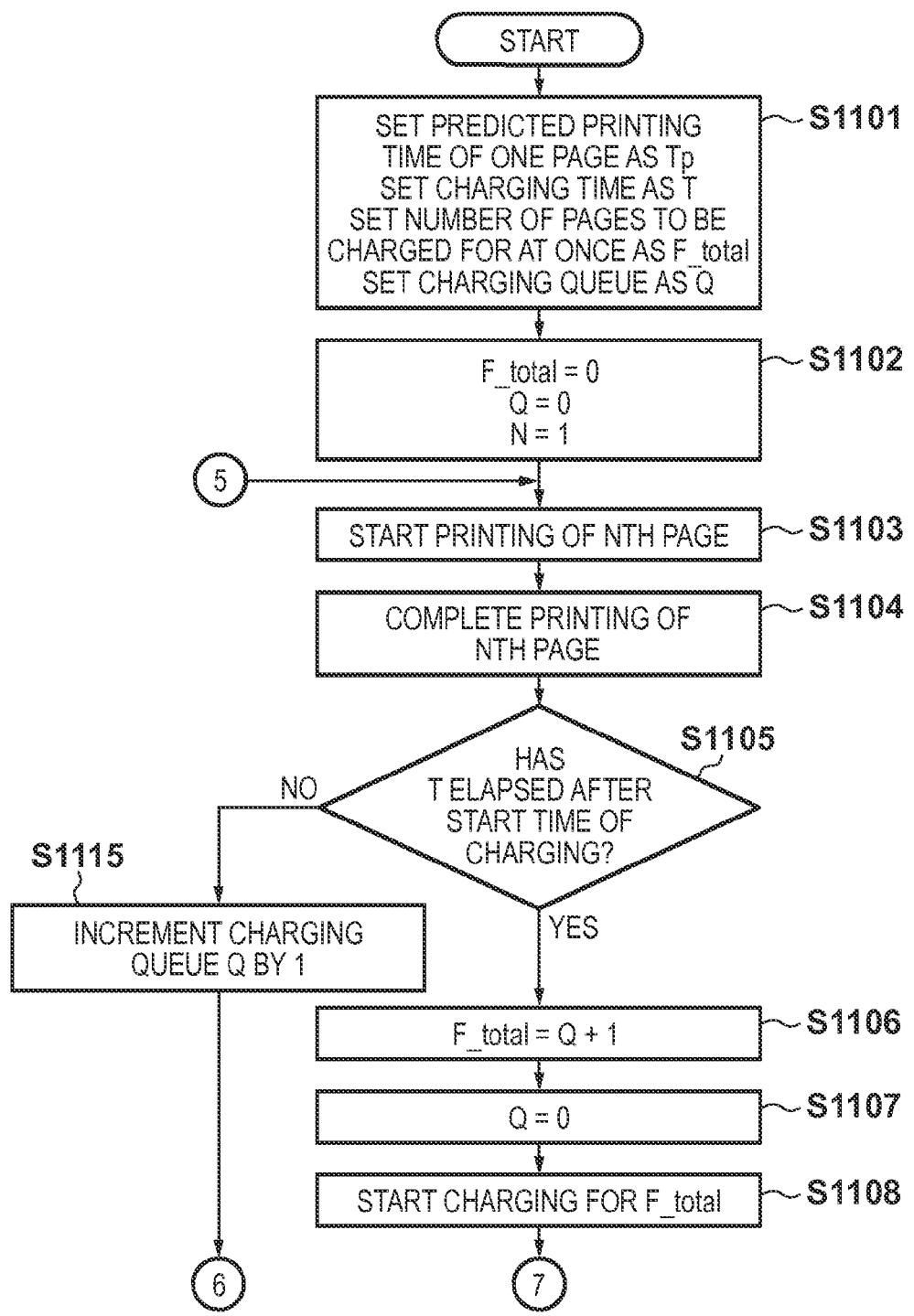

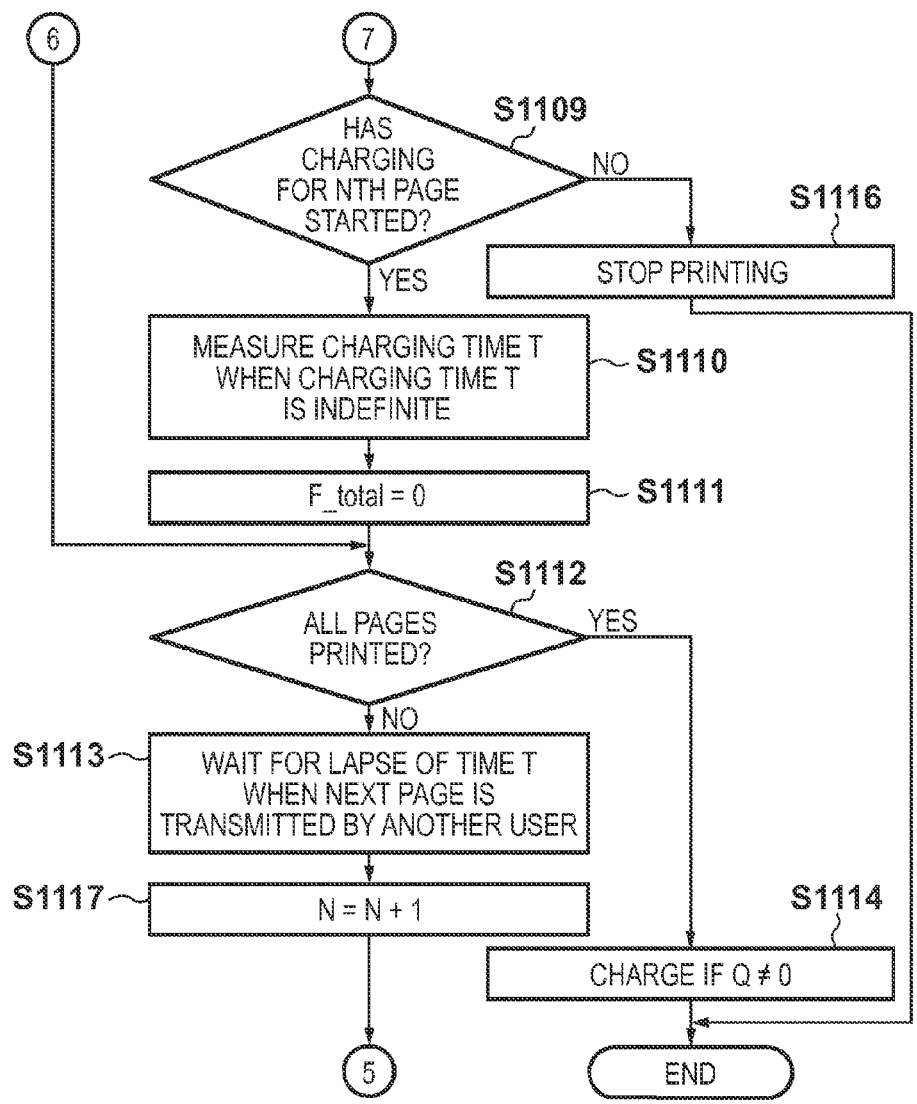

PROCESSING APPARATUS, CHARGING METHOD, AND STORAGE MEDIUM STORING PROGRAM

BACKGROUND OF THE INVENTION

1. Field of the Invention

The present invention relates to a processing apparatus which charges, a charging method, and a storage medium storing a program.

2. Description of the Related Art

Conventionally, there is known a technique of paying the fee of printing executed by a printing device by using general-purpose electronic money stored in an IC card or the like (Japanese Patent Laid-Open No. 2007-140990). In a value collection system disclosed in Japanese Patent Laid-Open No. 2007-140990, a print job transmitted from a terminal is printed after a printing device charges for the print job by using general-purpose electronic money. In this system, an information terminal such as a PC transmits a print job, and another IC card is charged for the print job. Recently, there is also known a technique of incorporating the mechanism of general-purpose electronic money of an IC card in a mobile terminal (Japanese Patent Laid-Open No. 2006-48270).

These techniques can be used to implement a printing apparatus in which the user pays for printing of every sheet by general-purpose electronic money, unlike a conventional method of first charging a predetermined amount of money, and then charging for printing of every sheet from the charge amount.

As another technique, there is known a technique of performing high-speed data transfer using a mobile terminal. It is known to perform short-distance wireless communication in addition to communication via a conventional communication network. A partner communication apparatus in short-distance wireless communication is, for example, an MFP (Multi Function Printer), and is known to transmit/receive image data and the like. By using the above-described mechanism of general-purpose electronic money of an IC card, and the mechanism of transmission/reception of image data and the like using a mobile terminal, processing from transmission of a print job to payment can be completed using one mobile terminal.

When the aforementioned general-purpose electronic money installed in a mobile terminal is used, the following problems arise. When paying a predetermined amount by general-purpose electronic money, initialization of the protocol, mutual authentication between a mobile terminal and a printing apparatus, and the like need to be performed and take a predetermined time. Recently, the printing speeds of printing apparatuses are increasing. When every sheet is charged, the time of payment by general-purpose electronic money may become longer than the time of printing, and charging may not catch up.

SUMMARY OF THE INVENTION

An aspect of the present invention is to eliminate the above-mentioned problems with the conventional technology. The present invention provides a processing apparatus which appropriately executes charging processing when the charging processing time is longer than the printing time, a charging method, and a storage medium storing a program.

The present invention in one aspect provides a processing apparatus comprising: an executing unit configured to execute a job received from a communication terminal; and a charging unit configured to perform charging between the processing apparatus and the communication terminal in accordance with an execution unit of the job by the executing unit, wherein in a case where a time required for one charging process by the charging unit is longer than a processing time of the execution unit of the job, the charging unit performs charging corresponding to a plurality of execution units of the job by the one charging process.

According to the present invention, charging processing can be appropriately executed when the charging processing time is longer than the printing time.

Further features of the present invention will become apparent from the following description of exemplary embodiments with reference to the attached drawings.

BRIEF DESCRIPTION OF THE DRAWINGS

FIGS. 10A and 10B are views for explaining the relationship between the time required for printing and the time required for charging;

FIGS. 11A and 11B are flowcharts showing the procedures of processing by the MFP when charging is performed upon completion of printing.

DESCRIPTION OF THE EMBODIMENTS

Figure 1:
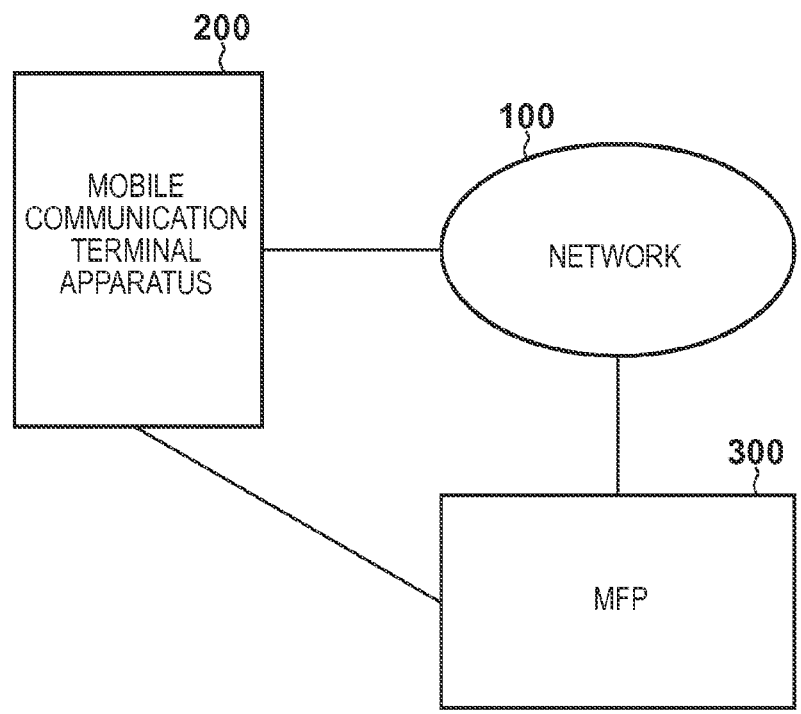
FIG. 1 is a block diagram showing the arrangement of a wireless communication system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

The embodiment will explain control of a printing sequence when transmitting a print job by using a mobile terminal (communication terminal), performing image processing by a multi-function printer (MFP), and then performing charging, and control of a charging sequence. Although a print job is transmitted to the MFP arbitrarily via a network or a USB, the embodiment will explain a case in which a print job is transmitted using NFC (Near Field Communication) communication. NFC is communication using a short-distance noncontact field induction method, and can transmit/receive data without a cable connection. NFC can be used to implement even a charging mechanism using electronic money, in addition to transmission/reception of job data and a status.

FIG. 1 is a block diagram showing the arrangement of a printing communication system according to the embodiment. A mobile terminal 200 and MFP 300 are connected to each other via a network 100 serving as the center so that they can communicate with each other. The mobile terminal 200 can implement NFC wireless communication, and a plurality of settlement methods using general-purpose electronic money. The mobile terminal 200 is, for example, a personal information terminal (for example, PDA (Personal Digital Assistant)), a mobile phone, a digital camera, or a smartphone, and suffices to be an apparatus capable of handling a file to be printed. The MFP 300 has a reading function of optically reading an original set on a platen, and a printing function using a printing unit such as an inkjet printer (inkjet printing apparatus). The MFP 300 may also have a facsimile function and telephone function. The network 100 and MFP 300 are connected by a wired LAN or wireless LAN (WLAN), and can receive print jobs from a plurality of external PCs to execute them. The network 100 and mobile terminal 200 are connected by the WLAN, and can also transmit a job to the MFP via the WLAN. The mobile terminal 200 and MFP 300 have an arrangement for performing NFC communication, and can implement transmission/reception of print job data and a status response, settlement processing by electronic money, and the like by peer-to-peer (P2P).

Figure 2:
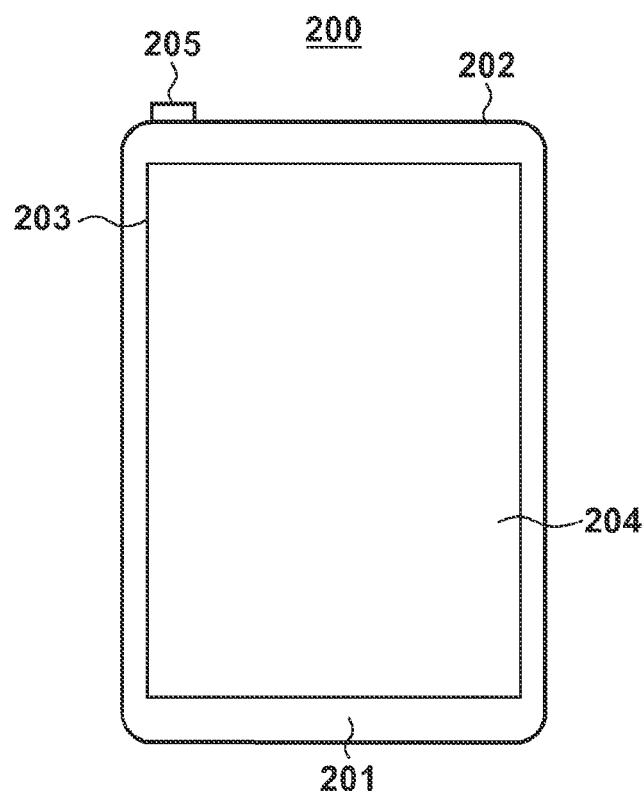
FIG. 2 is a view showing the outer appearance of a mobile terminal.

FIG. 2 is a view showing the outer appearance of the mobile terminal 200. The embodiment will exemplify a smartphone. The smartphone indicates a multi-function mobile phone which incorporates a camera, network browser, email function, and the like in addition to the functions of a mobile phone. An NFC unit 201 is a portion for performing communication using NFC. When the user actually brings the NFC unit 201 close to a partner NFC unit within about 10 cm, the NFC units can communicate with each other. A WLAN unit 202 is a unit for performing WLAN communication, and is arranged in the terminal. A display unit 203 is a display having an LCD display mechanism. An operation unit 204 includes a touch-panel operation mechanism, and detects information of pressing by the user. As a representative operation method, the display unit 203 displays software keys and the like, and when the user presses a button on the operation unit 204, an event corresponding to the pressing is issued. A power key 205 is used to turn on/off the power supply.

Figure 3A:
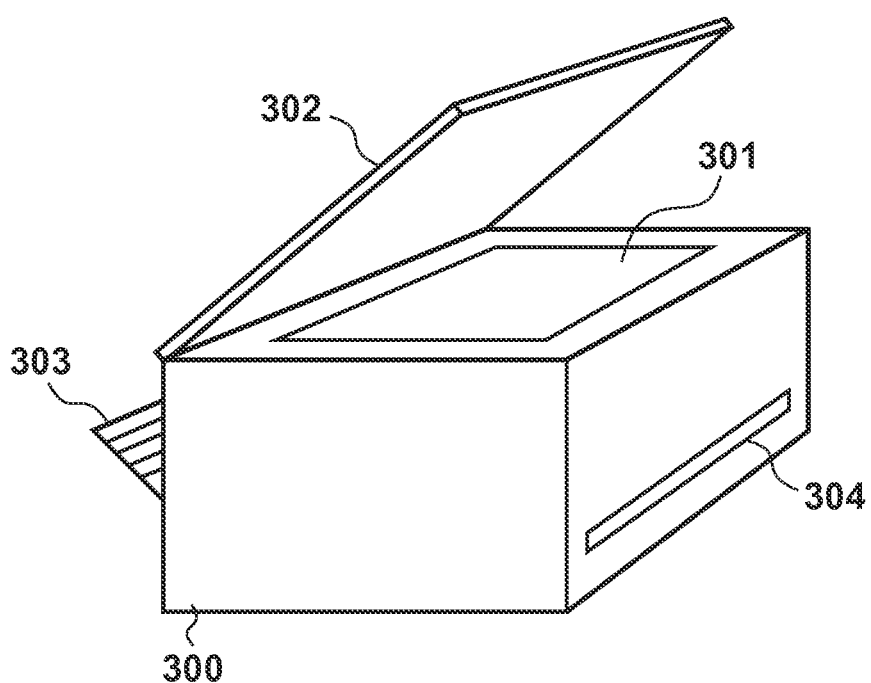
FIGS. 3A and 3B are views showing the outer appearance of an MFP.
Figure 3B:
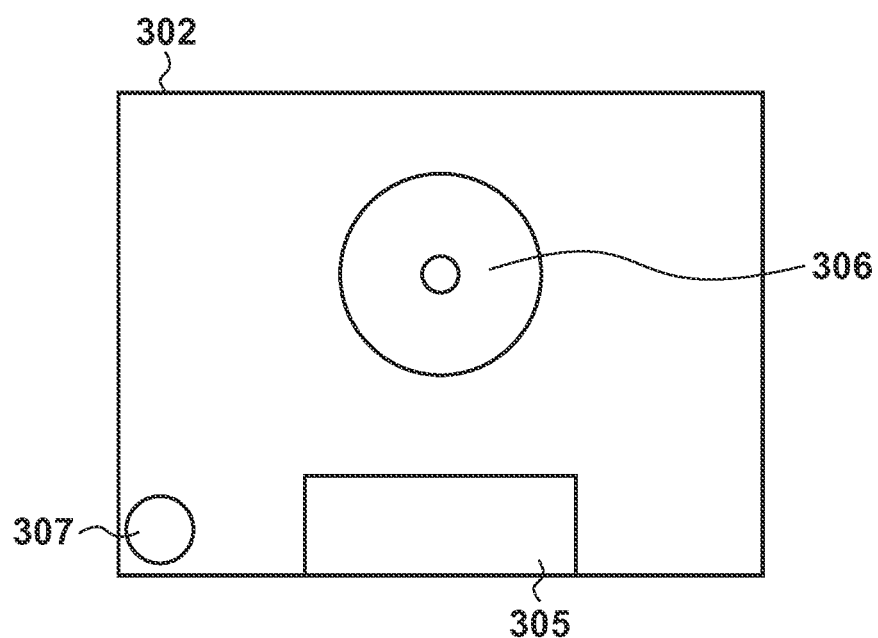

FIGS. 3A and 3B are views showing the outer appearance of the MFP. A platen 301 is a transparent glass table and is used to set an original on it and read the original by a scanner. An original cover 302 is a cover for preventing external leakage of reading light at the time of reading by the scanner. A printing paper insertion port 303 is an insertion port at which paper sheets of various sizes are set. Paper sheets set at the printing paper insertion port 303 are conveyed one by one to a printing unit, undergo desired printing, and are discharged from a printing paper discharge port 304. An operation/display unit 305 and NFC unit 306 are arranged at the top of the original cover 302. The operation/display unit 305 includes hardware keys such as a four-way selector key and start key, and an LCD display unit. The NFC unit 306 is a unit for performing near field wireless communication, and is a portion at which the user actually brings the mobile terminal 200 close to the MFP 300 and touches the MFP 300. The effective distance of contact (touch) is about 10 cm from the NFC unit 306. A WLAN antenna 307 includes an antenna for performing WLAN communication.

Figure 4:
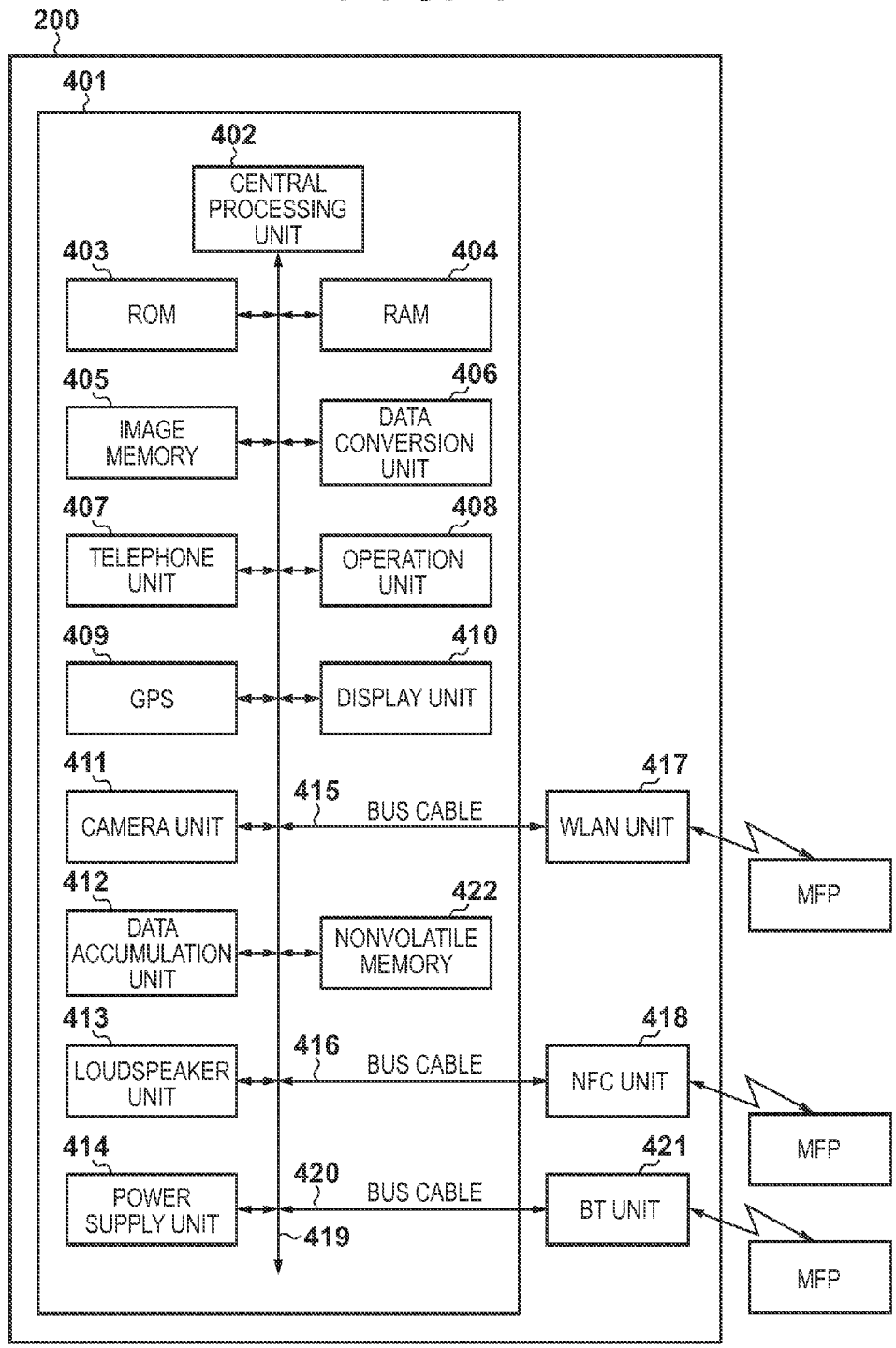
FIG. 4 is a block diagram showing the mobile terminal.

FIG. 4 is a block diagram showing the mobile terminal 200. The mobile terminal 200 includes a main board 401 for executing main control of the apparatus, a WLAN unit 417 for performing WLAN communication, an NFC unit 418 for performing NFC communication, and a BT unit 421 for performing Bluetooth® communication. A CPU 402 of the main board 401 is a system control unit, and controls the overall mobile terminal 200. A ROM 403 stores control programs to be executed by the CPU 402, an embedded operating system (OS) program, and the like. In the embodiment, the respective control programs stored in the ROM 403 perform software control such as scheduling and task switching under the management of the embedded OS stored in the ROM 403. The CPU 402 reads out a control program stored in the ROM 403 to a RAM 404 and executes it to implement an operation in the mobile terminal 200 according to a sequence (to be described later).

The RAM 404 is implemented by an SRAM (Static RAM) or the like, stores program control variables and the like, and also stores set values registered by the user, management data of the mobile terminal 200, and the like. Various work buffer areas are also allocated in the RAM 404. An image memory 405 is implemented by a DRAM (Dynamic RAM) or the like, and temporarily stores image data received via a communication unit and image data read out from a data accumulation unit 412 so as to process them by the CPU 402.

A nonvolatile memory 422 is implemented by a flash memory or the like, and stores data which needs to be saved even after power-off. In the embodiment, user information of general-purpose electronic money, balance information, security information for mutual authentication, and the like are saved in the nonvolatile memory 422. Charging according to the embodiment is executed according to a charge method. The user holds in advance a predetermined amount of money in the mobile terminal 200 by using a dedicated application. An NFC memory 605 (to be described later) also holds information managed by general-purpose electronic money in the nonvolatile memory 422. When using a service, the user pays a predetermined amount of money by using the NFC unit. In addition, the nonvolatile memory 422 stores address book data and the like.

The memory structure of the mobile terminal 200 is not limited to the above-described one. For example, the image memory 405 and RAM 404 may share a memory, or data may be backed up in the data accumulation unit 412. In the embodiment, a DRAM is used, but a hard disk, nonvolatile memory, or the like may be used.

A data conversion unit 406 performs analysis of a page description language (PDL) and the like, and data conversion such as color conversion and image conversion. A telephone unit 407 controls a telephone line, and implements telephone communication by processing audio data input/output via a loudspeaker unit 413. An operation unit 408 controls signals of the operation unit 204 described with reference to FIG. 2. A GPS (Global Positioning System) 409 acquires information of the current latitude and longitude of the mobile terminal 200, and the like. A display unit 410 electronically controls the display contents of the display unit 203 described with reference to FIG. 2, accepts various input operations, and can display the operation and status of the MFP 300 and the like.

A camera unit 411 has a function of electronically recording and encoding an image input via a lens. An image captured by the camera unit 411 is saved in the data accumulation unit 412. The loudspeaker unit 413 implements a function of inputting or outputting a speech for a telephone function, and also an alarm notification function and the like. A power supply unit 414 includes a portable battery and controls it. A power supply state includes, for example, a battery dead state in which the battery runs out, a power-off state in which the power key 205 is not pressed, an active (power-on) state in which the apparatus is active normally, and a power saving state in which the apparatus is active in the power saving mode.

The mobile terminal 200 can perform wireless communications by three methods: WLAN, NFC, and Bluetooth®. With arrangements for them, the mobile terminal 200 can perform data communication with another device such as an MFP. At the time of data communication, the mobile terminal 200 converts data into packets, and transmits the packets to another device. Conversely, the mobile terminal 200 receives packet data from another external device, converts it into processible data, and outputs the data to the CPU 402. For example, first, the mobile terminal 200 transmits connection information of WLAN and Bluetooth by using NFC, after ending the NFC communication, switches the communication to a relatively high-speed communication method such as WLAN or Bluetooth, and transmits image data or the like. The WLAN unit 417, NFC unit 418, and BT unit 421 are connected via bus cables or the like, respectively. The WLAN unit 417, NFC unit 418, and BT unit 421 implement wireless communication complying with the respective communication standards. Details of the NFC unit will be described later with reference to FIG. 6. The above-described building components 403 to 414, 417, 418, 421, and 422 are connected to each other via a system bus 419, and controlled by the CPU 402.

Figure 5:
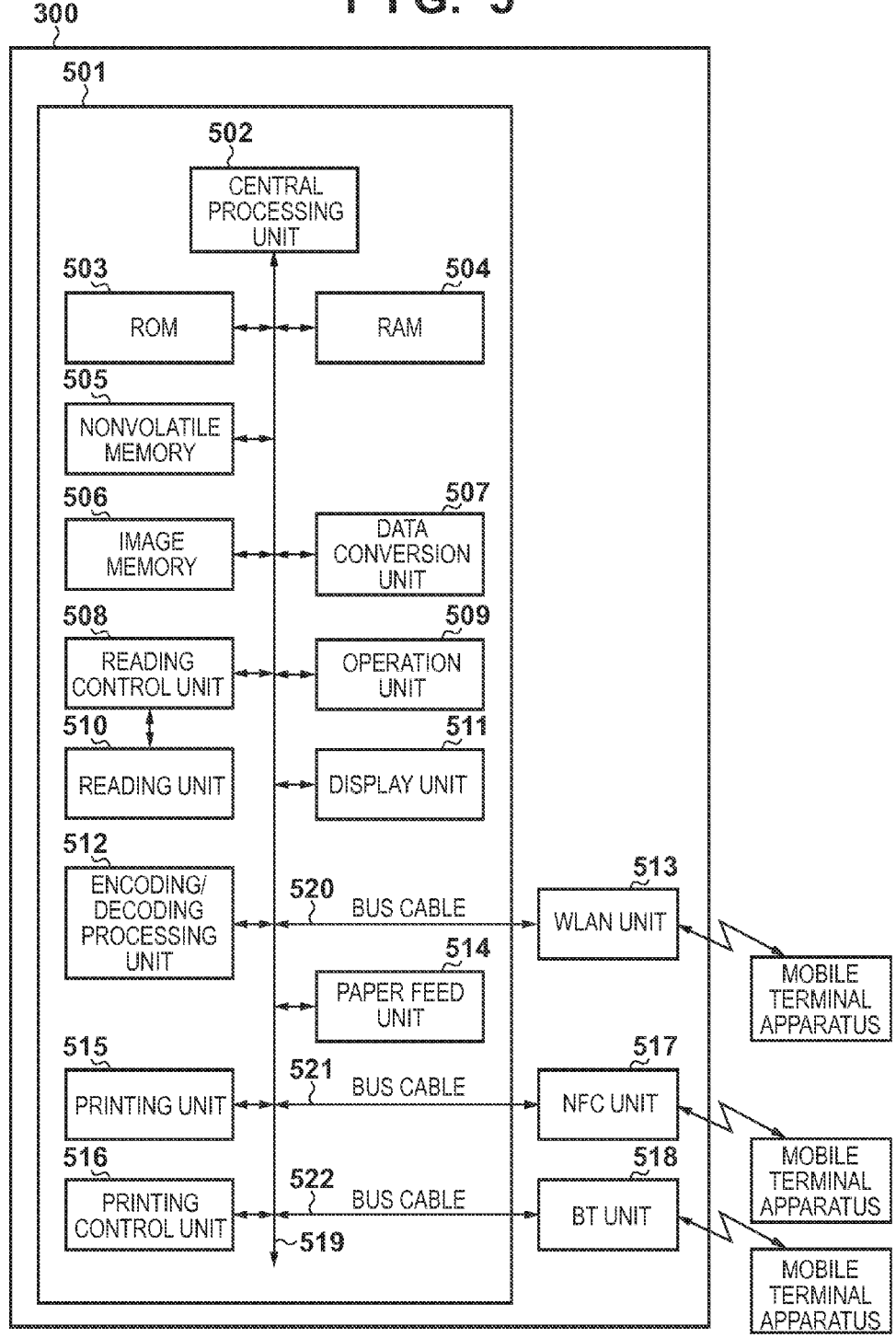
FIG. 5 is a block diagram showing the schematic arrangement of the MFP.

FIG. 5 is a block diagram showing the schematic arrangement of the MFP 300. The MFP 300 includes a main board 501 for performing main control of the apparatus, a WLAN unit 513 for performing WLAN communication, an NFC unit 517 for performing NFC communication, and a BT unit 518 for performing Bluetooth communication.

A CPU 502 of the main board 501 is a system control unit, and controls the overall MFP 300. A ROM 503 stores control programs to be executed by the CPU 502, an embedded operating system (OS) program, and the like. In the embodiment, the respective control programs stored in the ROM 503 perform software control such as scheduling and task switching under the management of the embedded OS stored in the ROM 503. The CPU 502 reads out a control program stored in the ROM 503 to a RAM 504 and executes it to implement an operation in the MFP 300 according to a sequence (to be described later). Some control programs perform charging control, and make it possible to decide a charging amount, and to transmit/receive control commands for charging to/from the mobile terminal 200 by using the NFC unit 517.

The RAM 504 is implemented by an SRAM (Static RAM) or the like, stores program control variables and the like, and also stores set values registered by the user, management data of the MFP 300, and the like. Various work buffer areas are allocated in the RAM 504. A nonvolatile memory 505 is implemented by a flash memory or the like, and stores data which needs to be held even after power-off. Such data include, for example, network connection information, user data, a job history, charging information, and a charging history. An image memory 506 is implemented by a DRAM (Dynamic RAM) or the like, and accumulates image data received via each communication unit, image data processed by an encoding/decoding processing unit 512, and the like. Also, the memory structure of the MFP 300 is not limited to the above-described one, similarly to the memory structure of the mobile terminal 200. For example, the image memory 506 and RAM 504 may share a memory. In the embodiment, a DRAM is used for the image memory 506, but a hard disk, nonvolatile memory, or the like may be used. A data conversion unit 507 performs analysis of a page description language (PDL) and the like, conversion from image data into print data, and the like. The PDL sometimes takes time for processing depending on the description method, and may take several ten sec to several min for a print job having many pages. Thus, the PDL may be a factor which varies the estimated time of a print job.

A reading unit 510 optically reads an original by a CIS image sensor (Contact Image Sensor). A reading control unit 508 performs various image processes such as binarization processing and halftone processing via an image processing control unit (not shown) on an image signal obtained by converting the read original into electrical image data, and outputs high-resolution image data. An operation unit 509 and display unit 511 include various setting keys for performing an operation by the user, and an LCD for presenting a display. The encoding/decoding processing unit 512 executes encoding/decoding processing and enlargement/reduction processing for image data (for example, JPEG or PNG) to be processed by the MFP 300.

A paper feed unit 514 holds paper sheets for printing. A paper sheet is fed from the paper feed unit 514 under the control of a printing control unit 516. To hold a plurality of types of paper sheets, the paper feed unit 514 may include paper feed units capable of holding paper sheets of a plurality of sizes. The printing control unit 516 controls to select a paper feed unit to be used to feed paper sheets.

The printing control unit 516 performs, via the image processing control unit (not shown), various image processes such as smoothing processing, printing density correction processing, and color correction on image data to be printed, converts the image data into high-resolution image data, and outputs the obtained image data to a printing unit 515. The printing control unit 516 can also periodically read out information of the printing unit, and update information stored in the RAM 504. For example, the printing control unit 516 updates the remaining amount of an ink tank, a printhead nozzle state, and the like. The printing unit 515 is constituted by an inkjet printing type printhead, and can form an image by discharging ink droplets onto a paper surface. According to a serial scanning inkjet printing method, the printhead repeats a reciprocal operation in the main scanning direction to form an image. For example, for an image having a large blank region, a paper sheet can be fed without printing, thereby increasing the printing speed. The MFP 300 also incorporates three arrangements for performing wireless communication, as in the mobile terminal 200. The above-described building components 502 to 516 are connected to each other via a system bus 519, and controlled by the CPU 502.

Figure 6:
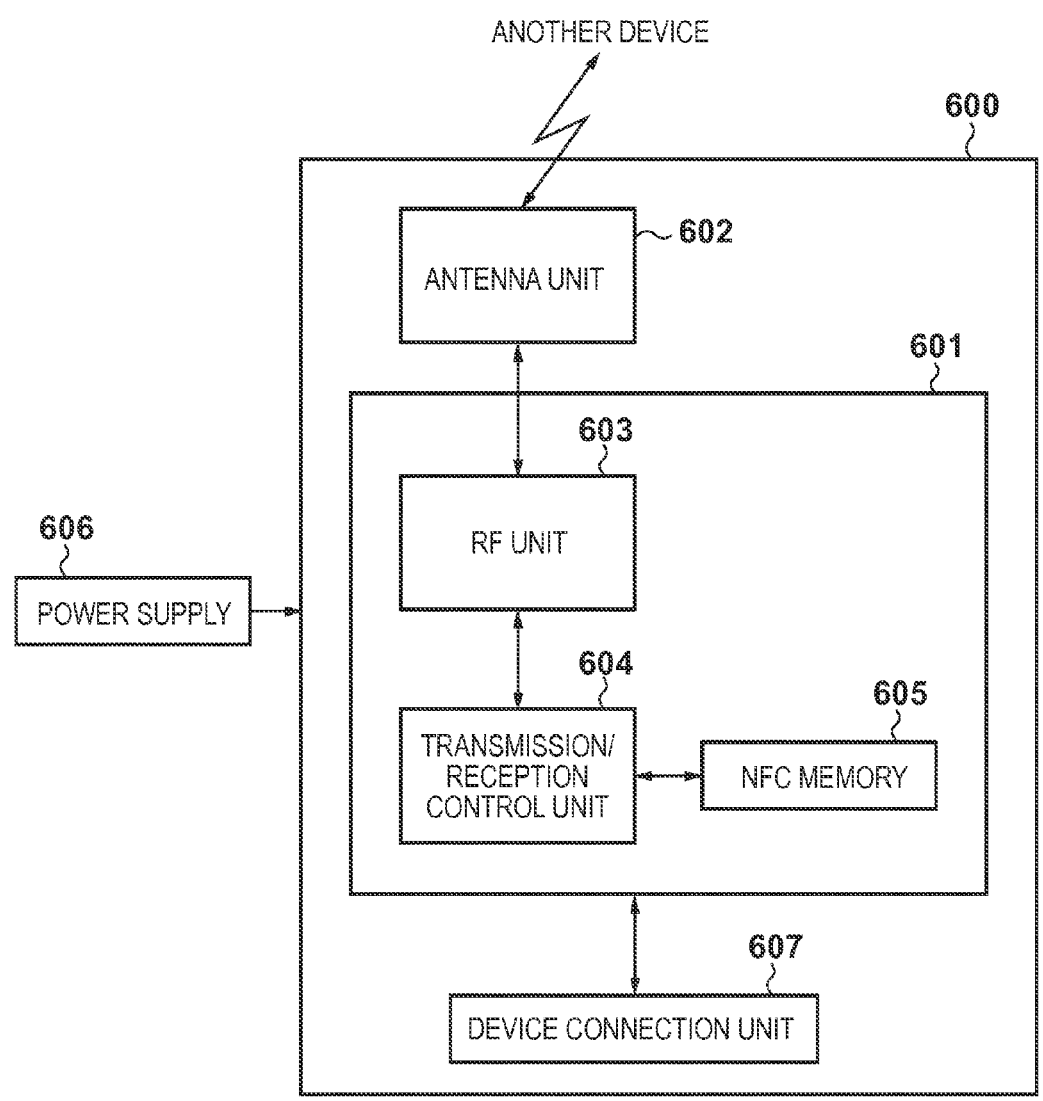
FIG. 6 is a block diagram for explaining details of an NFC unit.

FIG. 6 is a block diagram for explaining details of an NFC unit used as the NFC unit 418 or 517. NFC communication will be explained. When performing near field wireless communication by the NFC unit, an apparatus which first outputs an RF (Radio Frequency) field to start communication will be called an initiator. An apparatus which responds to an instruction issued by the initiator and communicates with the initiator will be called a target.

Here, a passive mode and active mode will be explained. The passive mode and active mode exist as communication modes of the NFC unit. In the passive mode, the target responds to an instruction from the initiator by performing load modulation. For this reason, the target does not require supply of power. In the active mode, the target responds to an instruction from the initiator by an RF field generated by the target itself. To do this, the target requires supply of power.

The active mode has a feature in which the communication speed can become higher than that in the passive mode.

The arrangement of an NFC unit 600 will be explained with reference to FIG. 6. The NFC unit 600 includes an NFC controller unit 601, an antenna unit 602, an RF unit 603, a transmission/reception control unit 604, the NFC memory 605, a power supply 606, and a device connection unit 607. The antenna unit 602 receives radio waves or carriers from another NFC device, or transmits radio waves or carriers to another NFC device. The RF unit 603 has a function of modulating/demodulating an analog signal into a digital signal. The RF unit 603 includes a synthesizer. The RF unit 603 identifies band and channel frequencies, and controls the band and channel based on frequency allocation data. The transmission/reception control unit 604 performs control regarding transmission/reception, such as assembly and disassembly of a transmission/reception frame, addition and detection of a preamble, and frame identification. The transmission/reception control unit 604 also controls the NFC memory 605, and can read/write various data and programs from/in the NFC memory 605. The NFC memory 605 stores data necessary for communication of electronic money. Electronic payment can be achieved by transmitting electronic money by NFC communication from an external apparatus, and a predetermined amount of money can be charged in accordance with a program in the mobile terminal 200. The NFC memory 605 stores authentication data for mutual authentication between the mobile terminal 200 and the MFP 300 by using NFC. By transmitting/receiving data in predetermined procedures, authentication processing can be performed.

When the NFC unit 600 operates in the active mode, it receives supply of power via the power supply 606. The NFC controller unit 601 communicates with the main body via the device connection unit 607 or communicates with another NFC device falling within a communicable range by using carriers transmitted/received via the antenna unit 602. When the NFC unit 600 operates in the passive mode, it receives carriers from another NFC device via the antenna unit 602, receives supply of power from another NFC device by electromagnetic induction, and communicates with the other NFC device by carrier modulation to transmit/receive data. With this arrangement, the target in the passive mode can wirelessly communicate with the initiator even without sharing power from a batter, AC power supply, or the like.

Figure 7:
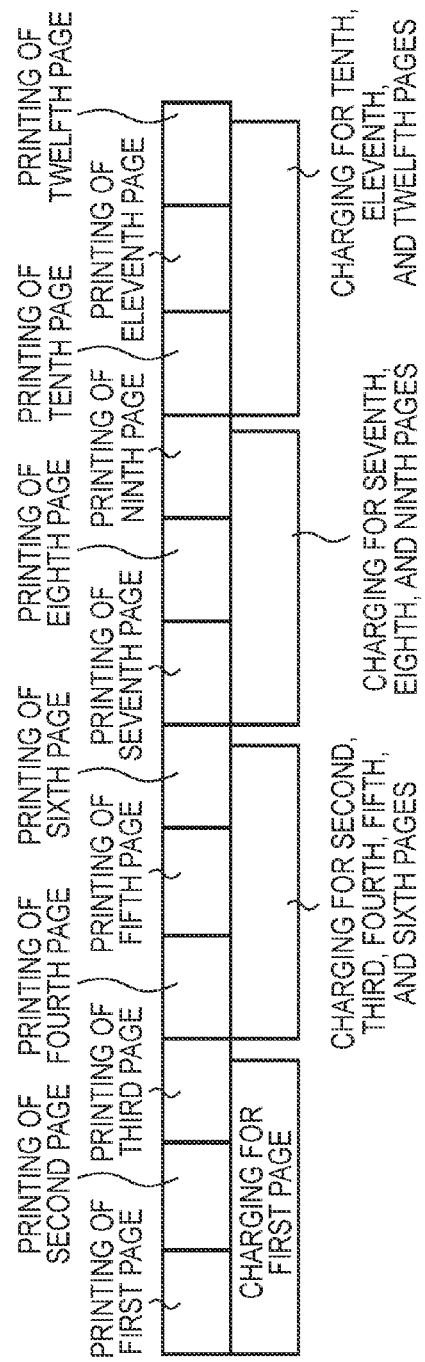
FIGS. 7A and 7B are views for explaining the relationship between the time required for printing and the time required for charging.

FIGS. 7A and 7B are views for explaining the relationship between the time required for printing and the time required for charging. A detailed sequence will be described later with reference to FIGS. 9A and 9B, and an outline will be explained here. In a scheme of charging for all pages at once before printing according to a charging method of charging for a plurality of pages at once, refund may become necessary when an estimated amount does not match the number of printed sheets. In a scheme of charging for all pages at once after printing, a printed material may be taken away without charging. To prevent this, the embodiment adopts a charging scheme of charging for printing of every sheet by the printing apparatus. According to the scheme of charging for printing of every sheet in the embodiment, the charging amount is set in accordance with the result of print processing, and an appropriate charging amount can be set in comparison with the scheme of charging before printing. This can prevent the above-mentioned refund. According to the embodiment, when printing a plurality of pages, unprinted pages are not printed unless charging is completed for an intermediate page. This can prevent taking away a printed material without charging.

FIGS. 7A and 7B show an example in which every page is charged for. The charging timing is before the completion of printing. The abscissa in the upper stage of each of FIGS. 7A and 7B represents the print processing time, and the abscissa in the lower stage represents the charging time. "One page" shown in FIGS. 7A and 7B is an example of the execution unit of a job. Charging processing between the MFP 300 and the mobile terminal 200 is performed in accordance with the execution unit.

A paper sheet may be jammed in the printing unit of the MFP, or ink may run out, and printing may not be able to be continued though charging is performed. Considering such a case, it is desirable to perform charging at the timing when printing has been normally completed. However, the mobile terminal 200 is only placed on the NFC unit. If the mobile terminal 200 is removed immediately before the completion of printing, the MFP cannot quickly stop the operation and discharges printed paper sheets. As a result, so-called printing fleeing from charging becomes possible. In the embodiment, therefore, charging is performed at the timing before the end of printing. In the embodiment, charging is performed before the start of printing one page, but may be performed at another timing before the completion of printing after the start of it.

Note that the unit of charging is not limited to every page. For example, charging may be performed when a partial region of a page, such as ½ or ⅓ of one page, is printed. A plurality of pages are sometimes printed on one paper sheet, as in double-sided printing or layout printing. In this case, charging may be performed every time one page is printed, or every time a plurality of pages are printed on one paper sheet.

In addition, for example, charging may be performed every time a predetermined amount of data is printed, or every predetermined time. The predetermined amount of data or the predetermined time is set to be a value much smaller than the amount of all data to be printed or the time taken to print all data to be printed. As the method, for example, the number of pages to be printed, or the number of pixels of an image is acquired from the mobile terminal apparatus 200 when receiving a print job. The data amount or printing time corresponding to all the data to be printed is specified in accordance with the number of pages or the number of pixels, and the specified value is divided to set the predetermined amount of data or the predetermined time. Alternatively, a sufficiently small fixed value may be set as the predetermined amount of data or the predetermined time.

As described above, in the embodiment, printing of every page is basically charged for. However, for example, when the printing speed is high and the speed of processing for charging is low, printing waits for the completion of charging processing and printing of the next page cannot be started though the next page can be printed immediately upon completion of printing one page.

Hence, in the embodiment, when printing of one page is completed and charging processing for the page is not completed till the start of printing the next page, the next page is printed without waiting for the completion of charging processing. When the next and subsequent pages are printed, charging for uncharged printed pages is executed at once. Details of this will be explained with reference to FIGS. 7A and 7B.

FIG. 7A shows an example when the charging time is slightly long with respect to the printing speed. In FIG. 7A, assume that charging processing starts at the start of printing one page. First, charging processing is performed for the first page at the timing when the first page is printed. Upon completion of printing the first page, printing of the second page is to be started. However, charging processing is being performed for the first page, so charging processing for the second page cannot be executed. Thus, charging processing for the second page is accumulated in a charging queue, and the second page is printed.

At the start of printing the third page after the end of printing the second page, charging processing for the second page remains in the charging queue, and charging processing is performed for the second page in addition to the third page. Considering the charging time of the first page, it is predicted that charging processing for the fourth page will not be performed at the start of printing the fourth page. Therefore, charging processing for the fourth page is performed together with charging processing for the third page. That is, in charging for the third page, charging processing for the second, third, and fourth pages is performed. At the start of charging processing for the second, third, and fourth pages, charging processing by communication between the mobile terminal apparatus 200 and the MFP 300 has not been completed, but the charging amount has been specified. For example, when calculating a charging amount in accordance with the printing mode (for example, color/monochrome, high quality/high speed) and the number of pages, a printing mode has been specified at the start of a print job. A charging amount A per page in this printing mode is charged in charging for the first page, and a charging amount of 3×A is charged in charging processing for the second, third, and fourth pages.

In this example, the charging time required for one charging processing is measured in printing the first page. If the charging time is known from the beginning, when performing charging processing for the first page, charging processing may be performed for a plurality of pages in advance in consideration of the printing speeds of succeeding pages. Since charging processing has already ended for preceding pages at the start of the fourth page, printing of the fourth page can be started. At the start of the fifth page, charging processing is similarly performed for the fifth and sixth pages. That is, in the embodiment, the number of pages corresponding to the charging time is larger by one than the maximum number of pages, printing of which can be completed within the charging time.

By this control, even when the charging time is longer than the printing time, charging can be implemented by a method similar to every-page charging processing. Even if image processing has not ended for all pages, printing can be started, unlike charging processing executed at once at the beginning. Even if the fee differs from the estimation, it is different by only several pages. Also, the timings and the number of pages fleeing from charging can be reduced, compared to charging processing performed at once finally.

FIG. 7B shows an example when the charging time is longer with respect to the printing speed than in the example of FIG. 7A. In FIG. 7B, printing of the first page is started after first charging for the first page. Since charging for the first page has not ended, charging processing for the second and third pages cannot be performed. Printing of the second and third pages is started while they are not charged yet. Charging processing for printing of the second and third pages is thus accumulated in the charging queue.

At the start of printing the fourth page after the end of printing the third page, charging processing for the second and third pages remains in the charging queue, and charging processing is also performed for the second and third pages in addition to the fourth page. Considering the charging time of the first page, it is predicted that charging processing for the fifth and sixth pages will not be performed at the start of printing the fourth page. Hence, charging processing for the fifth and sixth pages is performed together with charging processing for the fourth page. That is, in charging processing for the fourth page, charging processing for the second, third, fourth, fifth, and sixth pages is performed. This also applies to the seventh and succeeding pages.

In the examples of FIGS. 7A and 7B, the time required for charging processing is specified in accordance with the time required to charge for one page, and pages including unprinted pages are charged for at once in accordance with the specified time. This can prevent an increase in the number of uncharged pages.

However, charging processing according to the embodiment is not limited to this. It is also possible not to charge for unprinted pages, but to charge at once a page being printed and uncharged pages. This can reduce the possibility at which, even after charging for unprinted pages, printing cannot be executed owing to, for example, a printing error (for example, the absence of ink or a paper jam), or the user cancels printing and a charged page cannot be printed.

Charging processing is performed before the start of printing one page in the examples of FIGS. 7A and 7B, but may be performed upon completion of printing one page.

Figure 8:
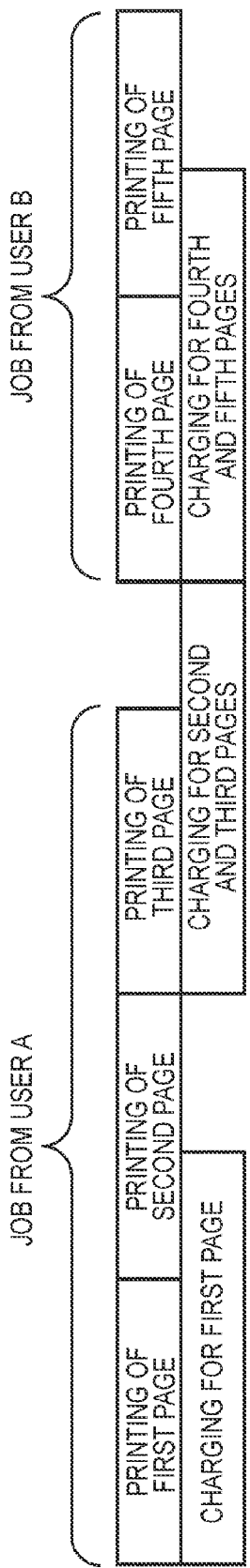
FIG. 8 is a view showing a case in which jobs of different users coexist.

FIG. 8 is a view showing an example when different users have transmitted jobs. In FIGS. 7A and 7B, charging processing is performed in advance based on prediction. However, when a preceding page in charging is a page transmitted by another user, the mobile terminal 200 to be charged is different, and charging cannot be executed. In such a case, printing of the fourth page is not started, and waits for the end of charging processing for the second and third pages. Then, the other mobile terminal 200 is charged for the fourth and fifth pages, and the fourth page is printed. Details of the processing will be described later with reference to FIGS. 9A and 9B.

Figure 9A:
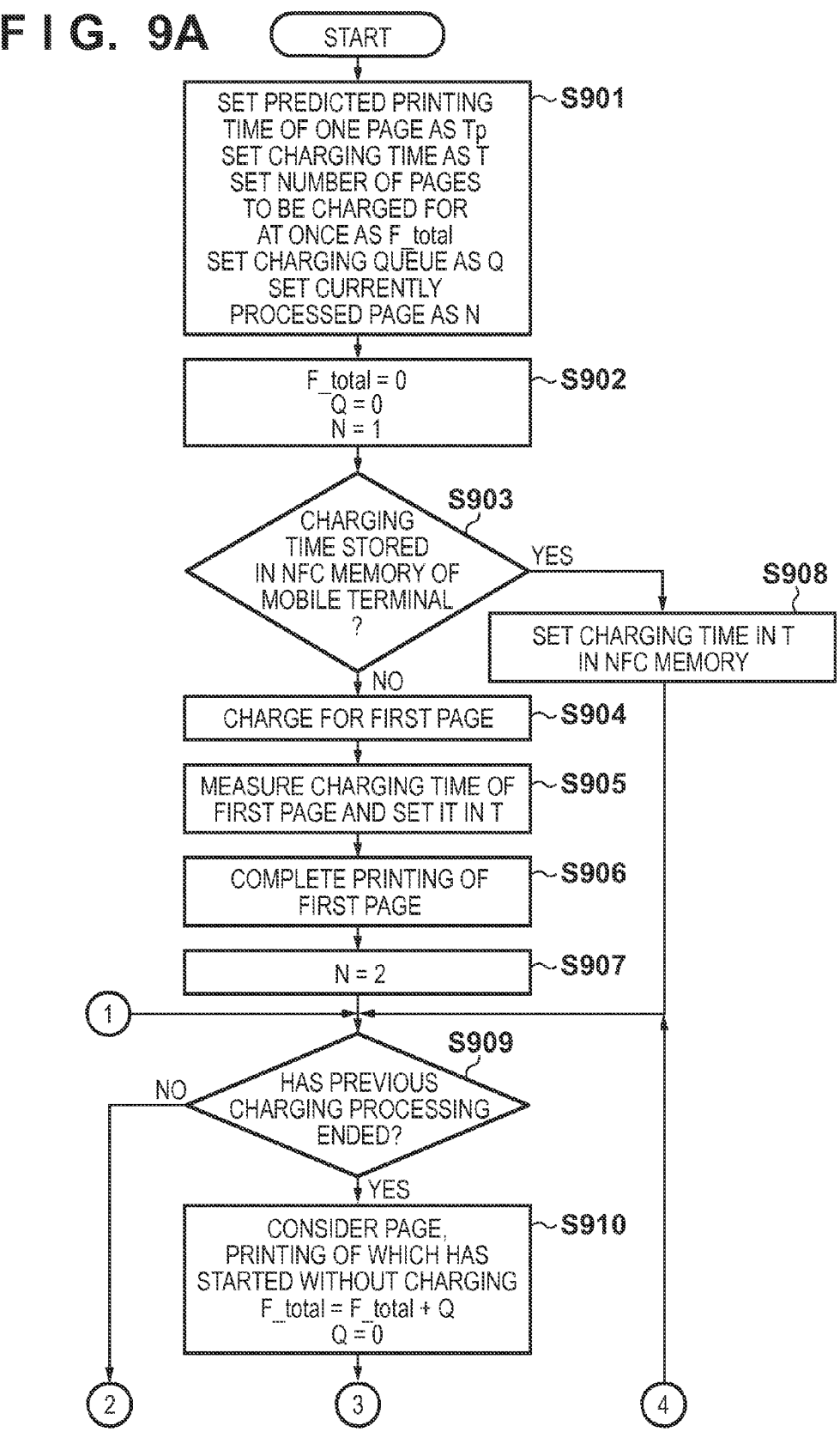
FIGS. 9A and 9B are flowcharts showing the procedures of processing by the MFP when charging is performed before the completion of printing.
Figure 9B:
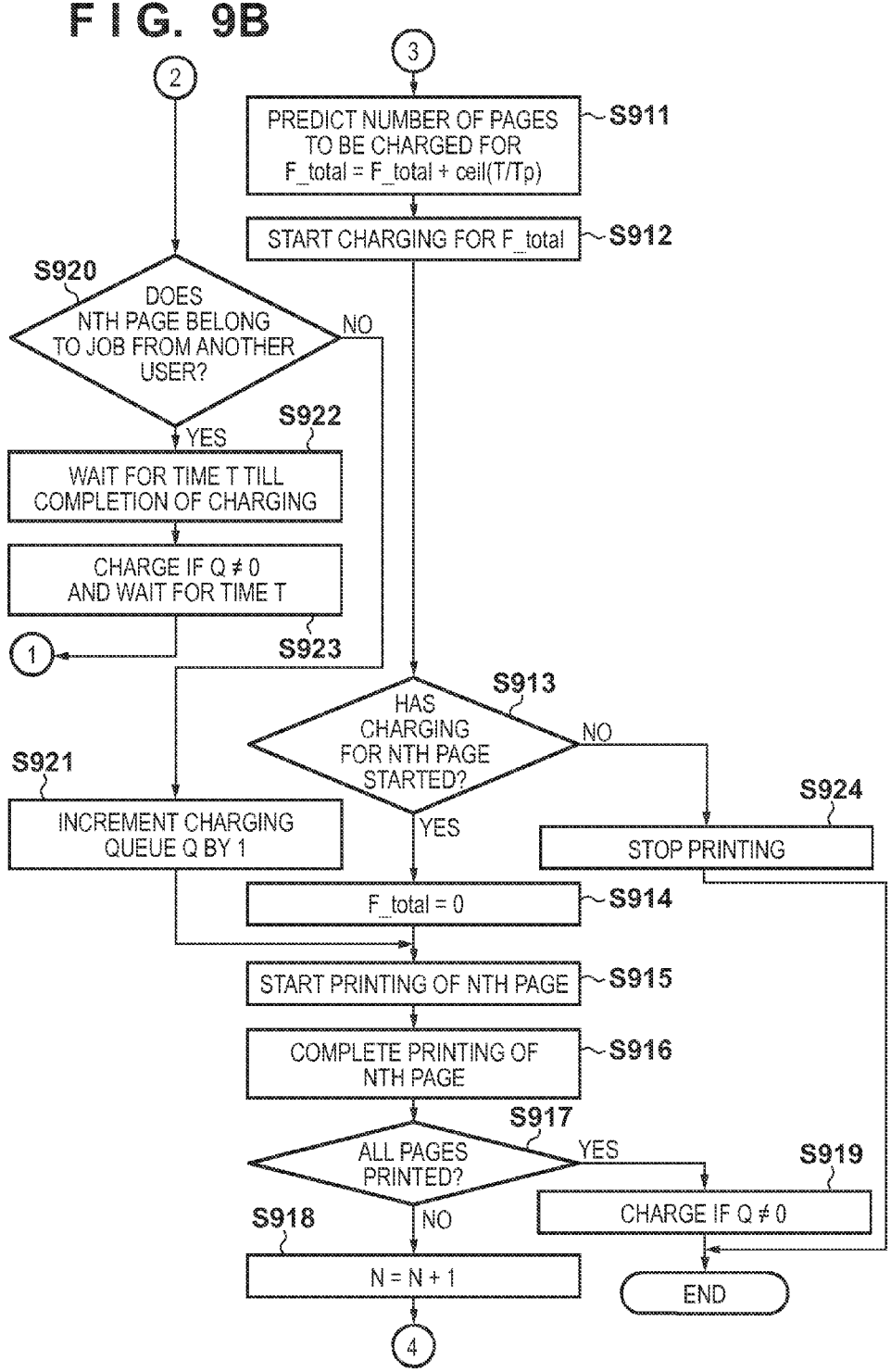

FIGS. 9A and 9B are flowcharts showing the procedures of processing by the MFP 300 when charging processing is performed before the completion of printing one page. In step S901, the following parameters are prepared in the storage area of the RAM or the like: a predicted printing time Tp of one page is prepared. The predicted printing time Tp is decided by the performance of the MFP 300, and can be roughly predicted based on print settings. When a factor which varies the printing time is generated, the predicted printing time Tp is changed appropriately. For example, when the printhead temperature rises, printing is sometimes performed in a mode in which the speed of the printhead is decreased from a speed in a normal state. In this case, the predicted printing time Tp is changed to a value corresponding to this mode. If the printing mode is a "fine mode" (high-resolution mode), the printing speed is decreased and the printing time is prolonged. In an inkjet printer in which the printhead prints while moving in the main scanning direction, when an image has a large blank region, the printhead moving time in the main scanning direction becomes short, and a paper sheet is fed in the sub-scanning direction in many cases. Thus, the printing speed is increased, and the printing time is shortened.

Also, a charging time T is prepared. The charging time T is the time until the MFP 300 ends charging processing after the MFP 300 starts it. For example, when the MFP 300 starts charging processing, it performs mutual authentication with the mobile terminal 200. If the mobile terminal 200 accepts a payment operation using electronic money from a user, it processes information of the electronic money and notifies the MFP 300 of it. Based on this notification, the MFP 300 can end charging processing.

Further, a charging quantity F_total of one charging is prepared. The charging quantity F_total is, for example, the number of pages. The charging amount is decided based on the charging quantity F_total in consideration of the unit cost of one paper sheet. The charging quantity F_total is decided based on the carryover of charging (charging quantity (number of pages) accumulated in the charging queue), and the number of chargeable pages.

In addition, a charging queue Q is prepared. The charging queue Q is a charging quantity (number of pages) which has been carried over because the charging quantity should have been charged but could not. Also, a current processing target page N is prepared.

In step S902, the charging quantity F_total, charging queue Q, and processing target page N are initialized to F_total=0, Q=0, and N=1, respectively. In step S903, a method of deciding the charging time T is selected. The charging time T is acquired by measuring the charging time of the first page to be printed by the MFP 300, or acquired from the nonvolatile memory 422 of the mobile terminal 200. For example, when the nonvolatile memory 422 of the mobile terminal 200 stores a predetermined charging time T, the charging time T may be acquired from the nonvolatile memory 422. Alternatively, the user may set an acquisition method on the setting screen of the MFP 300 in advance. If the charging time T is acquired from the nonvolatile memory 422 of the mobile terminal 200, the process advances to step S908. If, for example, the nonvolatile memory 422 of the mobile terminal 200 has not stored the charging time T in advance, the process advances to step S904.

Figure 12:
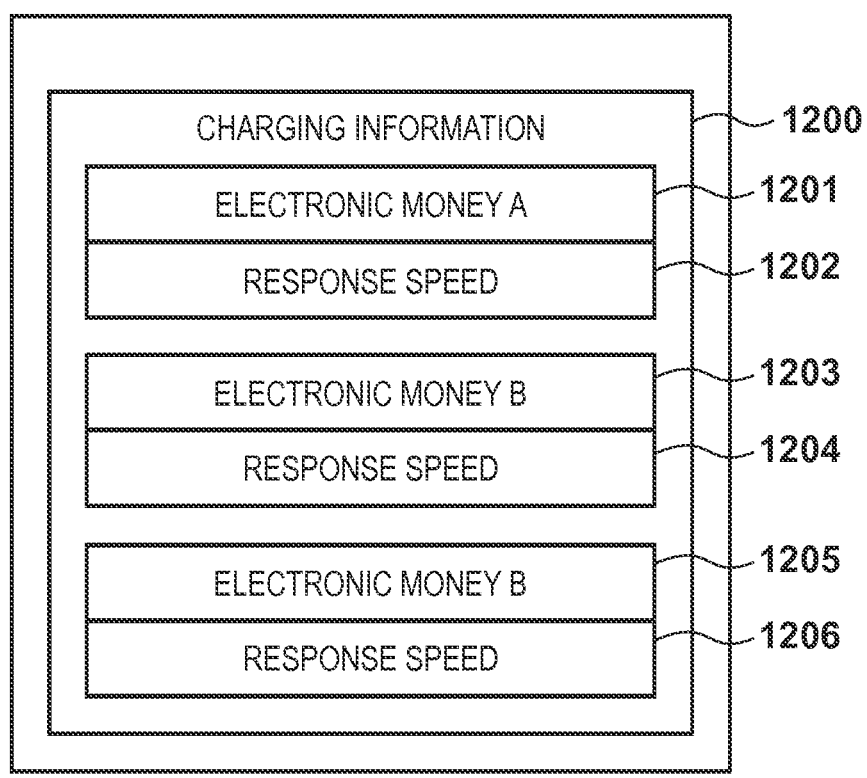
FIG. 12 is a view showing charging information stored in the nonvolatile memory of the mobile terminal.

To explain step S908, first, charging information 1200 stored in the nonvolatile memory 422 of the mobile terminal 200 will be explained with reference to FIG. 12. In the charging information 1200, the type of electronic money and the response speed are stored in association with each other. All electronic moneys 1201, 1203, and 1205 are transmitted to the MFP 300 by NFC communication. Since processing corresponding to the security level of each electronic money and processing such as an encryption policy are executed by software, response speeds 1202, 1204, and 1206 are greatly different. The MFP 300 acquires one of the electronic moneys 1201, 1203, and 1205 from the mobile terminal 200, and acquires even a response speed corresponding to the electronic money. The processing speed in the MFP 300 is added to the acquired response speed to decide the charging time T and store it in the nonvolatile memory 422. In the embodiment, the MFP 300 stores the charging time T in the nonvolatile memory 422 in step S908. Alternatively, before executing the processing in FIGS. 9A and 9B, the MFP 300 may acquire the charging time T and store it in the nonvolatile memory 422.

In step S904, charging processing is performed for the first page, and the charging time is measured. In step S905, the value measured in step S904 is set as the charging time T. Printing of the first page is completed in step S906, and the process shifts to processing of the second page in step S907. At this time, the processing target page N is set to N=2.

In step S909, it is determined whether previous charging processing has ended. This determination is made based on whether the charging time T has elapsed after the start of previous charging processing, or whether a signal serving as a trigger to complete charging processing has been actually detected. If it is determined that previous charging processing has not ended, the process advances to step S920. If it is determined that previous charging processing has ended, the process advances to step S910.

If it is determined in step S909 that previous charging processing has not ended, it is determined based on page information and job information in step S920 whether the Nth page belongs to a job corresponding to a user other than a user corresponding to the job of up to an immediately preceding page. This is equivalent to a case in which processing shifts from the third page to the fourth page in FIG. 8. If it is determined that the job is not a job of another user, the process advances to step S921. If it is determined that the job is a job of another user, the process advances to step S922. In step S921, the charging queue Q is incremented, and printing of the Nth page is started in step S915. The processing through steps S909, S921, and S915 is equivalent to, for example, processing of carrying over charging for the second page, accumulating it in the charging queue Q, and starting print processing for the second page because printing of the first page has ended but charging processing has not ended (second page in FIG. 7A).

If it is determined in step S920 that the Nth page belongs to a job of another user, printing of the Nth page is not started and waits in step S922 till the completion of charging processing. By executing this processing, erroneous charging of a job by another user can be prevented. As the determination criterion to wait printing without starting it, various determination criteria can also be set, including whether the job is another job, the department ID of a user, and a change of print settings, in addition to whether the user is another user. After waiting for the charging time T, the process advances to step S923. If the charging queue Q≠0 in step S923, that is, if carried-over charging processing remains, the charging processing is performed for the former user, and then the process returns to step S909.

If it is determined in step S909 that the previous charging processing has ended, charging processing for the next page has become possible, and the charging quantity at this time is decided in steps S910 and S911. In step S910, the charging queue Q serving as the carryover of up to previous charging processing is added to the charging quantity F_total. More specifically, the charging quantity F_total is calculated by:

$$F\_total = F\_total + Q \qquad (1)$$

For example, for the third page in FIG. 7A, F_total=0+1=1. The charging queue Q is set to Q=0 in step S910, and the process advances to step S911. In step S911, succeeding pages subjected to charging processing are predicted in consideration of the charging time T. This prediction is calculated by:

$$F\_total = F\_total + \operatorname{ceil}(T/Tp) \qquad (2)$$

where ceil(x) is the ceiling function which is a function defined as a minimum integer of x or larger with respect to a real number x. For example, when the charging time T=2 sec and the predicted printing time Tp=1.5 sec, ceil(T/Tp)=2, so two other pages are further subjected to charging. That is, for the third page in FIG. 7A, F_total=1+2=3. "3" is equal to the number of pages in "charging for second, third, and fourth pages" in FIG. 7A. For example, when T=2.5 sec and Tp=1 sec, ceil(T/Tp)=3, so three other pages are further subjected to charging. That is, for the fourth page in FIG. 7B, F_total=2 (because the charging queue Q=2)+3=5. "5" is equal to the number of pages in "charging for second, third, fourth, fifth, and sixth pages" in FIG. 7B.

After the calculation in step S911, charging processing for the charging quantity F_total is started in step S912. In step S913, it is determined whether charging processing has been started. If it is determined that charging processing has not been started, the process advances to step S924, and ends without starting printing. This is equivalent to a case in which charging processing could not be started because, for example, the user has taken away the mobile terminal 200 from the NFC unit 306. In this manner, when charging processing could not be executed, printing can be stopped quickly, suppressing a damage such as printing fleeing from charging.

If it is determined in step S913 that charging processing has been started, the charging quantity F_total is set to F_total=0 in step S914. Printing of the Nth page is started in step S915, and is completed in step S916. In step S917, it is determined whether printing of all target pages in the MFP 300 has been ended. If it is determined that printing of all pages has not been ended, the process advances to step S918. If it is determined that printing of all pages has been ended, the process advances to step S919. The processing target page N is incremented in step S918, and the process returns to step S909. If the charging queue Q≠0 in step S919, this indicates that the carryover of charging processing remains, so charging processing is performed, and the process ends. If the charging queue Q=0, the process directly ends.

If a factor which varies the printing time is generated in executing the processing of FIGS. 9A and 9B, the predicted printing time Tp may be changed. The factor which varies the printing time is, for example, a case in which the printhead temperature becomes higher than a reference value. When the predicted printing time Tp is changed, the changed predicted printing time Tp is used to perform the processing of step S911 at a subsequent stage.

FIGS. 10A and 10B are views for explaining the relationship between the time required for printing and the time required for charging, and show a case in which charging processing is performed upon completion of printing. A detailed sequence will be described later with reference to FIGS. 11A and 11B, and an outline will be explained here. As shown in FIG. 10A, after the end of printing the first page, charging processing for the first page is performed. After the end of printing the second page, the second page is to be charged for. However, charging processing for the first page has not ended yet, so charging processing for the second page cannot be performed. In the embodiment, therefore, charging processing for the second page is accumulated in the charging queue Q, and printing of the third page is started without performing charging processing for the second page at the time. After the end of printing the third page, charging processing is performed for the second and third pages at once.

By this processing, even when the charging time is longer than the printing time in a charging scheme of making a payment after the completion of printing, charging processing can be executed by a method similar to every-page charging. If, for example, the user takes away the mobile terminal 200 and charging processing fails when charging for the second and third pages, the fee of the second and third pages cannot be collected. However, printing can be aborted at the time to decrease the number of pages whose fee cannot be collected, in comparison with charging after printing all pages.

FIG. 10B shows an example when the charging time is much longer than the printing time, compared to the example of FIG. 10A. As shown in FIG. 10B, after the end of printing the first page, charging processing for the first page is performed. After the end of printing the second page, the second page is to be charged for. However, charging processing for the first page has not ended yet, so charging processing for the second page cannot be performed. Hence, charging processing for the second page is accumulated in the charging queue Q, and printing of the third page is started without performing charging processing for the second page at the time. Since charging processing for the first page has not ended yet even after the end of printing the third page, charging processing for the second and third pages cannot be performed. Even charging processing for the third page is accumulated in the charging queue Q, and printing of the fourth page is started without performing charging processing for the second and third pages at the time.

If the charging for the first page has ended at the end of printing the fifth page, charging processing for the second to fifth pages is performed at once at the end of printing the sixth to ninth pages.

FIGS. 11A and 11B are flowcharts showing the procedures of processing by the MFP 300 when charging is performed upon completion of printing one page. Processes in steps S1101 and S1102 are the same as those in steps S901 and S902 of FIGS. 9A and 9B. In steps S1103 and S1104, the Nth page is printed. Upon completion of printing, the process advances to step S1105. In step S1105, it is determined whether previous charging processing has ended. This determination is made based on, for example, whether the charging time T has elapsed after the start of previous charging processing, or whether a signal serving as a trigger to complete charging processing has been detected. If it is determined that previous charging processing has not ended, the process advances to step S1115. If it is determined that previous charging processing has ended, the process advances to step S1106. The case in which the process advances to step S1115 is equivalent to, for example, a case in which printing of the second page in FIG. 10A is completed. The case in which the process advances to step S1106 is equivalent to, for example, a case in which printing of the third page in FIG. 10A is completed.

If the process advances to step S1115, no charging processing can be performed, so the charging queue Q is incremented by one, and the process advances to step S1112. In step S1106, the charging quantity is calculated to perform charging processing. The charging quantity is a value obtained by adding the just printed Nth page to a value accumulated in the charging queue Q. More specifically, the charging quantity F_total is calculated by:

$$F\_total = Q+1 \quad (3)$$

For example, for the third page in FIG. 10A, F_total=0+1=1, which corresponds to the number of pages in "charging for first page" in FIG. 10A.

In step S1107, the charging queue Q is set to Q=0, and the process advances to step S1108. In step S1108, charging processing for the charging quantity F_total is started, and the process advances to step S1109. In step S1109, it is determined whether charging processing for the Nth page has been started. If it is determined that charging processing for the Nth page has been started, the process advances to step S1110. If it is determined that charging processing for the Nth page has not been started, the process advances to step S1116 to stop printing. The case in which the process advances to step S1116 is equivalent to, for example, a case in which the user has taken away the mobile terminal 200.

In step S1110, if the charging time T is indefinite, the charging time is measured. The measurement of the charging time is the same as the processing in steps S903 to S905 of FIGS. 9A and 9B. Alternatively, the charging time may be acquired from the nonvolatile memory 422 or NFC memory 605 of the mobile terminal 200, as in step S908 of FIGS. 9A and 9B. The charging quantity F_total is initialized to F_total=0 in step S1111, and the process advances to step S1112.

In step S1112, it is determined whether printing of all target pages in the MFP 300 has been ended. If it is determined that printing of all pages has not been ended, the process advances to step S1113. If it is determined that printing of all pages has been ended, the process advances to step S1114. In step S1113, it is determined whether the next page to be printed is a page by a job of another user. If it is determined that the next page is a page by a job of another user, the process waits for the lapse of the charging time T. Then, the processing target page N is incremented in step S1117, and the process returns to step S1103. If it is determined that the next page is not a page by a job of another user, the process advances to step S1117 without waiting for the lapse of the charging time T.

If it is determined in step S1112 that printing of all pages has been ended, the process advances to step S1114. If the charging queue Q≠0 in step S1114, this indicates a carryover owing to a charging failure, so charging processing is performed, and the process ends. If the charging queue Q=0, the process directly ends.

According to the processing of FIGS. 11A and 11B, upon completion of printing a page, this page and uncharged printed pages are charged for at once. As a result, printed pages can be appropriately charged for.

For example, printing is sometimes aborted owing to a printing error (for example, the absence of ink or paper, or a paper jam), or cancellation of printing by a user. When printing is aborted owing to a predetermined abortion factor, uncharged printed pages may be charged for. For example, in FIG. 10B, when printing is aborted during printing of the seventh page, charging processing for the second to sixth pages may be performed.

According to the processing of FIGS. 11A and 11B, one or a plurality of printed pages are charged for, and a charging amount corresponding to the printing contents of these pages can be set. For example, depending on the contents of a page, the amount of printing agent such as ink or toner used to print changes. In the processing of FIGS. 11A and 11B, a charging amount corresponding to the amount of printing agent used to actually print pages may be charged.

Note that the MFP 300 according to the embodiment may be an inkjet printing type printing apparatus which prints by applying ink to a printing medium, or an electrophotographic printing apparatus which prints by applying toner to a printing medium. According to the inkjet printing method, a printhead configured to discharge ink may discharge ink while being scanned with respect to a printing medium. Alternatively, the inkjet printing apparatus may be a line head type printing apparatus including a printhead whose length corresponds to the width of a printing medium. In the electrophotographic printing apparatus or line head type inkjet printing apparatus, the printing speed is relatively high, and the time of one charging processing is highly likely to be longer than the printing time of one page, as described in the embodiment. Even in this case, appropriate charging can be executed according to the processing of the embodiment.

In the above-described embodiment, the mobile terminal apparatus 200 and MFP 300 perform charging processing. However, the present invention is not limited to this, and the MFP 300 may perform NFC communication with the mobile terminal apparatus 200 and further communicate with an external apparatus (for example, a server on a network) to execute charging processing. For example, when charging is performed not by electronic money but by credit card settlement, the method of communicating with a server is conceivable. In this case, communication with a server becomes necessary, and charging processing may take time when, for example, the server is busy. The time of one charging processing is highly likely to be longer than the printing time of one page. Even in this case, appropriate charging can be executed according to the processing of the embodiment.

Although the above-described embodiment has exemplified printing by the MFP 300 as an example of a job to be performed by the MFP 300, processing corresponding to a job is not limited to this. Processing corresponding to a job is, for example, processing of transmitting, from the MFP 300 to the mobile terminal 200, data (for example, a read image obtained by reading an original by the MFP 300, or a document or image stored in the memory of the MFP 300). More specifically, when the mobile terminal 200 requests the MFP 300 to transmit various data mentioned above as a job, the MFP 300 transmits these data to the mobile terminal 200 in response to the request. Another example of processing corresponding to a job may be processing of storing, in an internal or external memory by the MFP 300, data transmitted from the mobile terminal 200 to the MFP 300, or processing of transmitting the data from the MFP 300 to an external apparatus (for example, a server on a network).

In the above-described embodiment, charging processing corresponding to the execution unit of a job is performed. For example, in printing, charging processing based on the number of printed pages is performed using a page to be printed as the execution unit. However, the processing of the above-described embodiment is applicable not only to charging processing, but also to, for example, counting processing of counting the number of printed pages. In this case, the number of printed pages may be counted for, for example, each user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159720, filed Jul. 31, 2013, which is hereby incorporated by reference herein in its entirety.

What is claimed is:

1. A processing apparatus comprising:
an executing unit configured to execute a job received from a communication terminal;
a charging unit configured to perform a charging process for one or more execution units of the job by the executing unit;
a comparing unit configured to compare a charging time required for the charging process by the charging unit for one execution unit, with a processing time for the one execution unit of the job executed by the executing unit; and a determining unit configured to determine a number of execution units for the charging process which is performed at one time by the charging unit, based on the comparison by the comparing unit, wherein in a case where, as a result of the comparison by the comparing unit, the charging is longer than the processing time, the determining unit determines a plurality of execution units as the number of execution units and the charging unit executes the charging process corresponding to the plurality of execution units at one time.

2. The apparatus according to claim 1, wherein in a case where, as a result of the comparison by the comparing unit, the charging time is equal to or shorter than the processing time, the determining unit determines one execution unit as the number of execution units and the charging unit executes the charging process corresponding to the one execution unit at one time.

3. The apparatus according to claim 1, further comprising a measuring unit configured to measure a time of charging between the processing apparatus and the communication terminal for a first execution unit for which the charging unit performs the charging process, and wherein the charging time is the time measured by the measuring unit.

4. The apparatus according to claim 1, further comprising a changing unit configured to change the charging time.

5. The apparatus according to claim 1, wherein in a case where, as a result of the comparison by the comparing unit, the charging time is longer than the processing time, the determining unit determines the plurality of execution units including a first execution unit for which processing by said executing unit has been completed and a second execution unit for which the charging process has not been executed.

6. The apparatus according to claim 5, wherein the second execution unit includes an execution unit for which processing by said executing unit has been completed and the execution unit for which the processing by the executing unit has been started and has not been completed.

7. The apparatus according to claim 1, wherein the charging unit performs the charging process in response to start or completion of processing of the execution unit.

8. The apparatus according to claim 1, wherein the job includes a print job, and the execution unit of the job corresponds to one page to be printed.

9. The apparatus according to claim 1, further comprising a control unit configured to execute a communication of NFC (near field wireless communication) between the processing apparatus and the communication terminal.

10. A charging method comprising:
an executing step of executing a job received from a communication terminal;
a charging step of performing a charging process for one or more execution units of the job in the executing step;
a comparing step of comparing a charging time required for the charging process in the charging step for one execution unit, with a processing time for the one execution unit of the job executed by the executing step; and
a determining step of determining a number of execution units for the charging process which is performed at one time in the charging step, based on the comparison by the comparing step,
wherein in the charging step, in a case where, as a result of the comparison by the comparing step, the charging time is longer than the processing time, the determining step determines a plurality of execution units as the number of execution units and the charging step executes the charging process corresponding to the plurality of execution units at one time.

11. A non-transitory computer readable storage medium storing a program for causing a computer to execute:
an executing step of executing a job received from a communication terminal;
a charging step of performing a charging process for one or more execution units of the job in the executing step;
a comparing step of comparing a charging time required for the charging process in the charging step for one execution unit, with a processing time for the one execution unit of the job executed by the executing step; and
a determining step of determining a number of execution units for the charging process which is performed at one time in the charging step, based on the comparison by the comparing step,
wherein in the charging step, in a case where, as a result of the comparison by the comparing step, the charging time is longer than the processing time, the determining step determines a plurality units as the number of execution units and the charging step executes the charging process corresponding to the plurality of execution units at one time.

* * * * *